Patented Sept. 25, 1934

1,974,745

UNITED STATES PATENT OFFICE 1,974,745

CALKING COMPOUND

Gustave Klinkenstein, Maplewood, N. J., assignor to Maas & Waldstein Co., Newark, N. J., a corporation of New Jersey No Drawing. Application May 23, 1932, Serial No. 613,137

5 Claims. (Cl. 106—37)

This invention relates, generally, to calking compounds or compounds used for sealing the joints between members; and the invention has reference, more particularly, to a novel calking compound employing a cellulosic derivative as a basic ingredient.

Calking compounds, as heretofore generally prepared, commonly employ vegetable or animal drying oils, such as linseed oil, together with suitable fillers or powders which give body to the compounds. Thus, ordinary putty has often been used as a calking compound. These calking compounds although satisfactory for many uses have proved to be quite unsatisfactory for other more exacting uses. For example, in using these calking compounds in the making of refrigerated show cases, wherein the edges of the glass plates of the show cases must be sealed against air and moisture, these commonly used calking compounds have proved to be very undesirable.

The walls of refrigerated show cases are usually constructed of spaced double or triple plate glass, thereby providing either vacuum or dead air spaces between successive plates of glass. These vacuum or dead air spaces must be permanently sealed against the ingress of air, moisture or other foreign material, or else the heat insulating properties of these vacuum or dead air spaces is lost. Commonly used calking compounds do not maintain the desired seal in show cases because these compounds usually dry out, shrink and harden with age, thereby pulling away from the glass plates and forming seams which let in air and moisture and other foreign matter which act to cloud the glass plates so that the walls of the show case cannot be seen through. Also, such commonly used calking compounds, employing vegetable or animal oils, are subject to fungus growths. When these compounds are used to seal the edges around glass plates of refrigerated show cases, a fungus growth commences on the surface of the calking compound and gradually spreads until ofttimes substantially the entire inner surfaces of the glass plates adjoining the compound are covered with a translucent or opaque mold.

The principal object of the present invention is to provide a novel calking compound which remains plastic and hence will not dry out and shrink in use, the said compound being easily applied with a putty knife or other instrument, will adhere fast to building materials, such as glass, metal and wood, and which is substantially unaffected by wide changes in temperature, the same remaining plastic at sub-zero temperatures as well as at relatively high temperatures.

Another object of the present invention lies in the provision of a novel calking compound which employs a cellulosic derivative as a basic ingredient together with a substantially non-volatile solvent softener having a softening action upon the cellulosic derivative used, the said compound being free of vegetable and animal oils and not subject to fungus growths.

Still another object of the present invention is to provide a novel calking compound of the above character having suitable fillers and preferably also pigments incorporated therein, which fillers and pigments give the desired body and color, respectively, to the calking compound.

A fourth object of the present invention lies in the provision of a novel calking compound of the above character which is easily compounded, is extremely stable in character, will not separate out or settle in shipping containers, will not sag or flow after put in place in use and is not affected by moisture or variations in humidity.

Further objects will appear from the following description and the appended claims.

In carrying out the present invention, there is employed a basic material or base, a solvent softener, a filler or fillers, and preferably a pigment or pigments to give any desired color to the calking compound. To the above ingredients there is preferably added a small percentage of a suitable preservative. These materials may be mixed in different proportions, depending upon the qualities required of the finished product.

The basic ingredient or base used is a cellulosic derivative, such as a cellulose ester, and, more particularly, for reasons of economy, a nitrocellulose of the pyroxylin type, although cellulose acetate or an ether, for example, ethyl cellulose, may be employed with satisfactory results.

By the term "solvent softener" employed in this specification is meant one or more solvents for cellulose derivatives which solvents are substantially non-volatile at all ordinary and even somewhat elevated temperatures as well as at sub-zero temperatures.

Any fillers or pigments may be used so long as they can be reduced to powdered form and are not chemically reactive with the vehicle, i. e. the mixture of cellulosic derivative and the solvent softener. It has been found that short fibre asbestos, infusorial earth and whiting are very satisfactory as fillers, although other materials such as the various colloidal clays, earths, mineral silicates, or felspar may be used for this purpose.

For pigments it has been found that a mixture of white pigment, such as lithopone or zinc oxide, with black pigment, such as carbon black, is very satisfactory.

The above ingredients, when used in the proper proportions, give a calking material which remains plastic, is moisture-resistant, being unaffected by water or changes in humidity, is easily worked as with a putty knife, is substantially unaffected by temperature changes ordinarily occurring in use, is not subject to fungus growth, and has the requisite adhesiveness for the purposes to which it is desired that it be put.

The approximate limits may be given broadly as follows, the percentages being by weight:

| | |
|---|---|
| Basic material | 1% to 7% |
| Solvent softener | 15% to 60% |
| Filler | 30% to 90% |

The exact proportions of the various ingredients will vary according to the qualities desired in the finished product, and these qualities depend upon the use to which the product is to be put. For example, if a relatively stiff and heavy calking compound is desired for some uses, then the relative percentage of the basic material and filler may be made high, while the percentage of the solvent softener is kept low, thereby obtaining the desired result. On the other hand, if an easily flowable product is desired, the relative percentages of the basic material and filler will be made low while the percentage of the solvent softener will be made relatively high. Thus it is possible by varying the proportions of these ingredients to obtain calking compounds having varying degrees of plasticity.

As a specific example of a calking compound embodying the principles of the present invention, the following ingredients are mixed together in the percentages given by weight:

| | Percent |
|---|---|
| Di-butyl phthalate | 31.4 |
| Nitrocellulose (½ sec. vis., alcohol wet) | 3.0 |
| Short fibre asbestos (asbestine) | 21.7 |
| Infusorial earth | 14.5 |
| Whiting (calcium carbonate) | 7.2 |
| White pigment (lithopone) | 21.7 |
| Black pigment (carbon black) | 0.2 |
| Camphor | 0.3 |

In this example, the short fibre asbestos, the infusorial earth and the whiting constitute the filler or filling materials. The combined weights of these filling materials always greatly exceeds the weight of the cellulosic ingredient.

The preferred manner of preparing this specimen of the compound is as follows:

Thirteen ounces of nitrocellulose and one and one-half ounces of camphor are dissolved in one gallon of di-butyl phthalate. Six pounds of short fibre asbestos, such as asbestine, four pounds of powdered infusorial earth; two pounds of powdered whiting; six pounds of a powdered white pigment, such as lithopone, and one ounce of a powdered black pigment, such as carbon black, are mixed together, and this filler-pigment mixture is mixed into the nitrocellulose-camphor-di-butyl phthalate solution. Any ordinary paste mixer may be used for carrying out this mixing operation. The inter-mixture of the above ingredients produces a thick paste which is then run through a grinding mill so as to completely flocculate all of the powders present, thereby causing these powders to become thoroughly wet. After leaving the grinding mill, the calking compound is completed and will be in a plastic condition, enabling the same to be readily worked with tools, such as a putty knife, the same remaining continuously plastic owing to the substantially non-volatile nature of the di-butyl phthalate solvent softener. This calking compound will keep well without the ingredients settling out in containers, the same will not sag or flow when put in place, it will not harden at sub-zero temperatures, it will not melt when subjected to heat, does not shrink or crack but maintains a tight seal, is not subject to fungus growths and does not dry or harden with age, and does not skin over when exposed.

Although in the example given, di-butyl phthalate is used as the solvent softener, it is to be understood that this invention is not limited to the use of di-butyl phthalate but that other solvent softeners or plasticizers may be used, so long as the solvent softener employed is substantially non-volatile at ordinary temperatures and will dissolve the cellulosic derivative, such as nitrocellulose. Examples of other solvent softeners which may be used are tricresyl phosphate, di-amyl phthalate and tri-butyl phosphate. In the event that another cellulose derivative, such as cellulose acetate is used in lieu of nitrocellulose, a suitable solvent softener, such as di-butyl tartrate will be employed. In using cellulose acetate the proportions of the several ingredients will remain much the same as when using nitrocellulose.

Various filling materials may be used in addition or in lieu of those listed in the preceding example. For instance, the various colloidal clays, earths or mineral silicates may be used. In fact any filler may be used so long as the same will not react chemically with the solution of cellulosic derivative and solvent softener. The same is true of the pigments employed. Thus, zinc oxide may be used in lieu of lithopone and black iron oxide used in lieu of carbon black.

If all pigment is omitted, the resulting compound will have its natural grayish color. The camphor ingredient acts as a preservative and insures against the development of fungus growths. Other suitable preservatives, such as thymol, may be used in place of camphor, if desired.

Although the novel compound of this invention adheres readily and continuously to all construction materials, yet the adhesiveness of the compound may be increased, if desired, for some uses by adding a quantity of suitable resin, such as gum dammar or a synthetic resin, such as that produced by condensing glycerine, phthalic anhydride and a fatty acid. Also, for some uses it is desirable to decrease the adhesiveness and frictional resistance of the compound of this invention, in which case a percentage of mineral oil, grease, wax or a metallic soap may be added.

What is claimed is:

1. A permanently plastic calking compound comprising, by weight, 1% to 7% of nitrocellulose, 15% to 60% of a substantially non-volatile solvent softener comprising one of the group, di-butyl phthalate, tricresyl phosphate, di-amyl phthalate and tri-butyl phosphate, and 30% to 90% of filler, the percentages being based on the total quantity of the ingredients.

2. A permanently plastic calking compound comprising, nitrocellulose, a solvent softener comprising one of the group, di-butyl phthalate, tricresyl phospate, di-amyl phthalate and tri-butyl phosphate in which the nitrocellulose is soluble, the amount of solvent softener being greater than the amount of nitrocellulose, the said solvent softener being substantially non-volatile at ordinary temperatures, and a filler, the amount of filler lying within the range of thirty to ninety per cent by weight of the total ingredients and being greater than the amount of nitrocellulose and the ingredients being present in such proportions as to form a readily workable plastic mass.

3. A permanently plastic and non-drying calking compound comprising, nitrocellulose, a solvent softener comprising one of the group, di-butyl phthalate, tricresyl phosphate, di-amyl phthalate and tri-butyl phosphate in which the nitrocellulose is soluble, the amount of solvent softener being considerably greater than the amount of nitrocellulose, the said solvent softener being substantially non-volatile at ordinary temperatures, a filler, and a trace of camphor as a preservative, the amount of filler being greater than the amount of nitrocellulose and the ingredients being present in such proportions as to form a readily workable plastic mass.

4. A permanently plastic and non-drying calking compound comprising, one of the cellulose derivatives, nitrocellulose and cellulose acetate, one of the solvent softeners, di-butyl phthalate and di-butyl tartrate, the amount of solvent softener being greater than the amount of cellulose derivative, a filler comprising short fibre asbestos, infusorial earth and whiting, a pigment comprising lithopone and carbon black, and a preservative, the ingredients being present in such proportions as to form a workable plastic mass.

5. A permanently plastic and non-drying calking compound, comprising a mixture of the herein named ingredients in the approximate proportions, as follows:

|  | Percent |
|---|---|
| Di-butyl phthalate | 31.4 |
| Nitrocellulose (½ sec. vis., alcohol wet) | 3.0 |
| Short fibre asbestos (asbestine) | 21.7 |
| Infusorial earth | 14.5 |
| Whiting (calcium carbonate) | 7.2 |
| White pigment (lithopone) | 21.7 |
| Black pigment (carbon black) | 0.2 |
| Camphor | 0.3 |

GUSTAVE KLINKENSTEIN.